(12) United States Patent
Noda

(10) Patent No.: US 8,610,064 B2
(45) Date of Patent: Dec. 17, 2013

(54) THERMAL DETECTOR, THERMAL DETECTOR DEVICE, AND ELECTRONIC INSTRUMENT

(75) Inventor: Takafumi Noda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 335 days.

(21) Appl. No.: 13/095,337

(22) Filed: Apr. 27, 2011

(65) Prior Publication Data
US 2011/0272581 A1    Nov. 10, 2011

(30) Foreign Application Priority Data

May 10, 2010    (JP) ................................. 2010-108370

(51) Int. Cl.
*G01J 5/12*    (2006.01)
*G01J 5/00*    (2006.01)

(52) U.S. Cl.
USPC ................... 250/338.1; 250/338.3; 250/336.1

(58) Field of Classification Search
USPC .................. 250/338.1, 338.3, 336.1; 257/467
See application file for complete search history.

(56) References Cited

U.S. PATENT DOCUMENTS

| | | | |
|---|---|---|---|
| 5,777,329 A * | 7/1998 | Westphal et al. | 250/339.02 |
| 6,020,216 A * | 2/2000 | Beratan et al. | 438/54 |
| 7,105,819 B2 * | 9/2006 | Ryu et al. | 250/338.3 |
| 7,812,385 B2 | 10/2010 | Noda | |
| 7,825,027 B2 | 11/2010 | Noda et al. | |
| 2007/0134817 A1 | 6/2007 | Noda | |
| 2008/0048119 A1* | 2/2008 | Tissot | 250/332 |
| 2008/0236526 A1* | 10/2008 | Yamamoto et al. | 123/90.16 |
| 2008/0303074 A1 | 12/2008 | Noda | |
| 2009/0068763 A1 | 3/2009 | Noda | |
| 2009/0072287 A1 | 3/2009 | Noda | |
| 2009/0127604 A1 | 5/2009 | Noda | |
| 2009/0236526 A1 | 9/2009 | Sasaki et al. | |
| 2010/0230595 A1 | 9/2010 | Uchida et al. | |

FOREIGN PATENT DOCUMENTS

| | | |
|---|---|---|
| JP | 2007-150025 A | 6/2007 |
| JP | 2008-003081 A | 1/2008 |
| JP | 2008-218782 A | 9/2008 |
| JP | 2009-065089 A | 3/2009 |
| JP | 2009-071022 A | 4/2009 |
| JP | 2009-071241 A | 4/2009 |
| JP | 2009-071242 A | 4/2009 |
| JP | 2009-124017 A | 6/2009 |
| JP | 2009-129972 A | 6/2009 |
| JP | 2009-130188 A | 6/2009 |
| JP | 2009-141179 A | 6/2009 |
| JP | 2009-229260 A | 10/2009 |

* cited by examiner

*Primary Examiner* — David Porta
*Assistant Examiner* — Yara Green
(74) *Attorney, Agent, or Firm* — Global IP Counselors, LLP

(57) ABSTRACT

A thermal detector has a substrate, a thermal detector element having a light-absorbing film, and a support member. The support member has a mounting part mounting the thermal detector element, a first arm part having one end that is linked to one end of the mounting part and another end that is supported on the substrate, and a second arm part having one end that is linked to the other end of the mounting part and another end that is supported on the other end of the substrate. A plurality of wirings electrically connected with the thermal detector element are provided on the first arm part, and the length of the second arm part is shorter than the length of the first arm part.

20 Claims, 9 Drawing Sheets

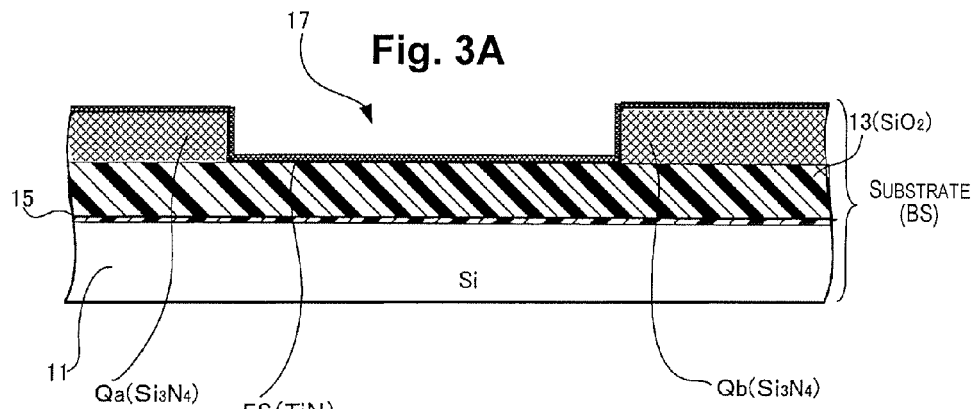
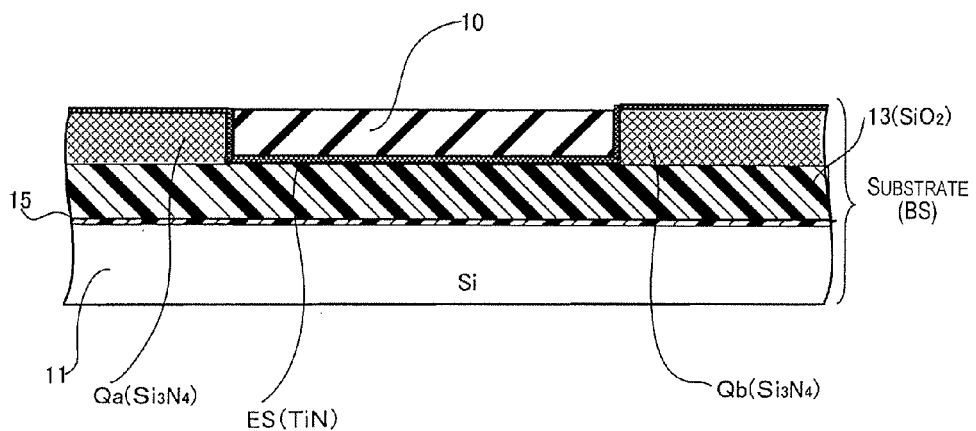
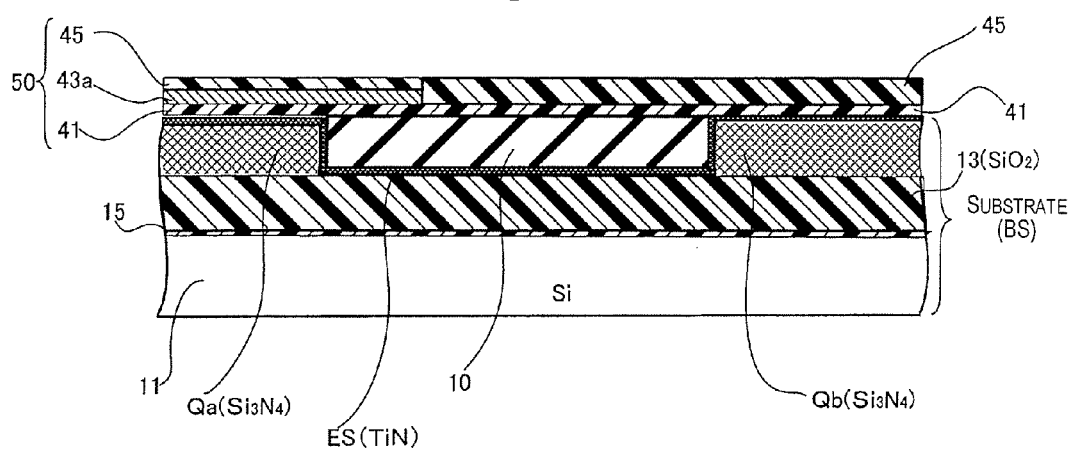

THERMAL DETECTOR, THERMAL DETECTOR DEVICE, AND ELECTRONIC INSTRUMENT

CROSS-REFERENCE TO RELATED APPLICATIONS

This application claims priority to Japanese Patent Application No. 2010-108370 filed on May 10, 2010. The entire disclosure of Japanese Patent Application No. 2010-108370 is hereby incorporated herein by reference.

BACKGROUND

1. Technical Field

The present invention relates to a thermal detector, to a thermal detector device, and to an electronic instrument.

2. Related Art

In the field of thermal detectors, thermocouple type elements (thermopiles), pyroelectric elements, and bolometers are known. A thermopile uses thermocouples to directly detect a rise in temperature in a light absorbing film in association with absorption of light.

A pyroelectric element utilizes the pyroelectric effect of a ferromagnetic body to detect a temperature rise in a light absorbing film that occurs in association with absorption of light. For example, ferroelectric PZT (lead zirconate titanate), lithium tantalate, and other such crystals with a high dielectric constant give rise to changes in the level of electrical polarization when heated or cooled. Specifically, spontaneous changes in the level of polarization arise when the temperature changes, producing changes in the level of surface charge; whereas in the absence of temperature change, the surface charge is neutralized. In association with changes in polarization conditions, pyroelectric current flow is produced due to changes in the amount of surface charge between electrodes connected to both ends of the ferroelectric crystal. By detecting this pyroelectric current (polarization level or dielectric constant resulting from changes in polarization level), it is possible to sense the quantity of irradiating light (infrared or the like). Bolometers detect increases in temperature associated with light absorption by detecting changes in the resistance value of, for example, a heat-sensitive resistance element.

Additionally, infrared-ray-detecting elements, which are one type of thermal detector element, are employed in the field of small-scale elements as personal sensors, for example, and in the field of large-scale arrays as infrared camera devices, for example. While initially developed as military technologies, such elements have been introduced more frequently in consumer products of late, and various applications for infrared detection may be anticipated in the future.

Thermal type detectors are mounted, for example, on a mounting part consisting of a thin film (membrane), where the mounting part is supported in a state of being suspended above the substrate by an arm. The arm must prevent thermal diffusion to the substrate while also having mechanical strength sufficient to stably support the mounting part.

The structures of thermal photodetectors are described, for example, in Japanese Laid-Open Patent Application Publication No. 2008-3081 and Japanese Laid-Open Patent Application Publication No. 2009-229260. With the infrared sensor described in Japanese Laid-Open Patent Application Publication No. 2008-3081, a resistor that undergoes a change in resistance depending on temperature is formed on a support seating, where this support seating is supported on a substrate by a pair (two) horizontal beams of the same length. The respective horizontal beams are provided with leads (wires) that are composed of a conductor material.

With the infrared sensor element described in Japanese Laid-Open Patent Application Publication No. 2009-229260, the detection cell part is supported on the substrate by a unitary support part. The unitary support part has a shape produced by a plurality of curved parts (switch-backs) in order to reduce thermal conductance.

SUMMARY

With the structure described in Japanese Laid-Open Patent Application Publication No. 2008-3081, each of the pair of horizontal beams having a prescribed length extends to both sides of the support seating, and there are thus limitations on reducing the surface area ("downsizing") of the thermal detector unit (cell).

In addition, with the structure described in Japanese Laid-Open Patent Application Publication No. 2009-229260, a cantilevered structure is adopted in which the detector cell part is supported only by one support part, and thus problems can arise in regard to the mechanical stability of the support part. For example, there is the danger of the support part breaking under the weight of the detector cell. In addition, because a cantilevered structure is used, there is potential for deformation such as twisting due to stresses or the like placed on the support member. Moreover, because the support part has multiple curves, the occupied surface area of the support part is increased. Furthermore, in Japanese Laid-Open Patent Application Publication No. 2009-229260, there is absolutely no discussion concerning the approach to making the plurality of arms asymmetrical in regard to thermal conductance.

In at least one configuration of the present invention, the size of the thermal detector can be readily decreased.

A thermal detector according to a first aspect of the present invention includes a substrate, a thermal detector element having a light-absorbing film, a support member, and a plurality of wirings. The support member has a mounting part, a first arm part and a second arm part. The mounting part mounts the thermal detector element. The first arm part supports the mounting part above the substrate and having one end linked to one end of the mounting part. The second arm part supports the mounting part above the substrate and having one end linked to the other end of the mounting part, a length of the second arm part being shorter than a length of the first arm part. The wirings are provided on the first arm part and electrically connected with the thermal detector element.

According to the aspect described above, the support part is supported respectively by the first arm part and the second arm part (utilizing a cantilevered structure). Thus, the mounting part can be supported stably, by either arm part. Increasing the support strength of each arm part is also easy to achieve.

In addition, a plurality of wirings that electrically connect to the thermal type detector element are provided on the first arm part. The length of the first arm part and the length of the second arm part are not the same, with the length of the second arm part being shorter (in other words, the first arm part and the second arm part are asymmetrical in regard to length).

By providing a plurality of wirings on the first arm part, for example, the thermal characteristics of the first arm part (e.g., the thermal resistance per unit length), and the thermal characteristics of the second arm part become unbalanced (in other words, equilibrium is not maintained in the thermal characteristics of the respective arm parts), and so it is not necessary for the length of the first arm part and the length of the second arm part to be the same (equivalent lengths) in regard to thermal design of the element.

By utilizing this approach, according to the above aspect, the length of the arm of the second arm part is shortened. By shortening the arm length of the second arm part, the occupied surface area of the second arm part is decreased, and the size of the thermal detector can be correspondingly reduced.

In the thermal detector as described above, the thermal conductance G1 of the first arm part and a thermal conductance G2 of the second arm part preferably satisfy a relationship G1≥G2.

The length of the second arm part can be made shorter than the length of the first arm part, under the condition that the thermal conductance of the second arm part not be greater than the thermal conductance of the first arm part. In other words, the relationship G1≥G2 obtains, where G1 is the thermal conductance of the first arm part and G2 is the thermal conductance of the second arm part. The second arm part can be shortened, provided that this condition is satisfied.

For example, there may be envisioned a case in which two wirings are provided on the first arm part, and, for example, wiring is not provided on the second arm part (or only one wiring (including a conductor layer) is provided).

Because multiple wirings (conductor materials (e.g., metal): typically having high thermal conductivity) are provided on the first arm, when the length of the first arm part and the second arm part are the same, then the thermal conductance of the second arm part will be larger than the thermal conductance of the first arm part. Consequently, the heat dissipation of the first arm part having high thermal conductance will be the governing factor, and the thermal detector element can be designed based on the heat dissipation characteristics of the first arm part. In other words, it is necessary to increase the arm length of the first arm part in order to inhibit thermal diffusion to the substrate.

On the other hand, the second arm part is constituted, for example, only by electrical insulating material (e.g., silicon oxide film or silicon nitride film) or has, for example, one wiring. Consequently, the thermal conductance of the second arm part will be smaller than the thermal conductance of the first arm part, and thus the thermal characteristics of the thermal detector will be determined depending on the characteristics of the first arm part, which has high thermal conductance.

No advantage will be gained in keeping the second arm part the same length as the first arm part, and having the thermal resistance set to a greater level than is necessary (no advantage will be gained by having thermal resistance imparted by the second arm part, despite the thermal characteristics being determined predominantly by the first arm). Thus, the length of the second arm part can be shorter than the length of the first arm part. The shortest possible length is the length at which the thermal conductance of the second arm part is equivalent to the thermal conductance of the first arm part (if the second arm part length is additionally decreased, then the heat dissipation characteristics of the second arm part will become predominant, and thermal design focused on the first arm part will not be possible). The surface area occupied by the second arm part is decreased by shortening the arm length of the second arm part, and the size of the thermal detector thus can be additionally decreased.

It is preferable, from the standpoint of design of the thermal detector, for the sectional surface areas of the constituent materials of the first arm part and second arm part to be the same, but the invention is not restricted to such a configuration, as different constituent materials and sectional surface areas may be provided. In this case as well, the effect of downsizing the thermal detector can be achieved, provided that the condition is satisfied that the length of the second arm part is shorter than the length of the first arm part.

In the thermal detector as described above, the first arm part preferably has a first insulating film provided on the substrate, a first wiring and a second wiring provided on the first insulating film, the first wiring and the second wiring being electrically isolated from each other and, and a second insulating film provided on the first wiring and the second wiring.

According to the aspect described above, each of the plurality of wirings is embedded in an interior part of the first arm part. When the respective wirings are formed on the first arm part, it is necessary to also form an insulating film (protective film) thereupon. Consequently, the heat capacity of the first arm part increases. If each of the plurality of wirings is embedded in an interior part of the first arm part, the insulating film that constitutes the first arm part also serves as a protective film for the wiring. Consequently, the insulating film used for protecting the wiring need not be separately provided, which has the advantage that the heat capacity of the support member (membrane) 50 can be decreased.

In the thermal detector as described above, the first arm part preferably has a first portion linked to the one end of the mounting part and extending in a first direction as seen in plan view, and a second portion connected to the first portion and extending in a second direction perpendicular to the first direction as seen in plan view, and the second arm part preferably has only a third portion linked to the other end of the mounting part and extending in the first direction.

In this aspect, in consideration of the requirement that the first arm part be longer in order to inhibit thermal diffusion, the shape of the first arm part has a curved part. In other words, the first arm part includes a first portion that extends in a first direction and a second portion that is horizontal and extends in a second direction that is perpendicular to the first direction. As a result, two dimensional space is effectively utilized, and the length of the arm in the first direction is reduced, so that the thermal conductance of the first arm part can be maintained within the allowed range. On the other hand, it is sufficient if the second arm part is provided only with a third portion that extends in the first direction, because the second arm part may be short. The shape as seen in plan view of the support member in this aspect (including the mounting part, the first arm part, and the second arm part) is compact and balanced. Consequently, a thermal detector array can be readily formed by using this structure as a unit (cell).

In the thermal detector as described above, the support member and the substrate are preferably arranged to form a cavity between the support member and the substrate, and the support member preferably has a circuit-constituting element provided on the substrate in a region overlapping with the cavity as seen in plan view.

By forming a circuit-constituting element related to the thermal detector (passive element such as a transistor or active element such as a transistor) in a region of the substrate that overlaps the cavity as seen in plan view (in other words, a region that is located under the cavity), the circuit-constituting element can be integrated on the substrate without increasing the surface area of the cell. This technology, for example, contributes to scaling down when producing large-scale arrays.

In the thermal detector as described above, the thermal detector element is preferably an infrared-ray-detecting element.

In this aspect, the structure is small in size and a mounting part is supported at either end; therefore, it is possible to produce an infrared detector that has superior mechanical strength and high reliability.

A thermal detector device according to another aspect of the present invention includes a plurality of the thermal detectors as described above arranged two-dimensionally.

As a result, a thermal detector device (thermal type photo array sensor) is produced in which a plurality of the thermal detectors (thermal detector elements) are arranged two-dimensionally (e.g., in an array form along two perpendicular axes).

A thermal detector device according to another aspect of the present invention includes a plurality of the thermal detectors as described above provided on a shared cavity. The first arm part of at least one of the thermal detectors is supported by a post that has a prescribed height from the substrate towards the thermal detector, the post including a conductive layer electrically connecting at least one of the wirings provided on the first arm part with a circuit-constituting element provided in a region of the substrate overlapping the shared cavity as seen in plan view.

By providing a circuit-constituting element in a region of the substrate that is located under the shared cavity, the required circuits can be formed without increasing the occupied surface area. By using a shared cavity, the structural burden is reduced, and a more compact thermal detector device is realized. In addition, by utilizing the post as contact wiring for providing electrical contact between the first wiring or second wiring and a circuit-constituting element, the thermal detector can be made more compact without requiring separate wiring for making contact. In addition, the production process can also be simplified.

In the thermal detector device as described above, the thermal detectors preferably includes a first thermal detector and a second thermal detector, and the second arm part of the first thermal detector and the first arm part of the second thermal detector are supported by the post.

As a result, two arm parts can be supported by a single post (where the respective arm parts are the arm parts of different thermal detectors), and the number of posts can be decreased. Consequently, burden is reduced from the standpoint of element production. Moreover, decreasing the number of posts effectively controls heat dissipation from the elements to the substrate. Each of the first thermal detectors and second thermal detectors is, for example, preferably disposed adjacently.

An electronic instrument according to another aspect of the present invention includes the thermal detector as described above.

As described above, the thermal detector has small structure while also having a mounting part, and the photodetector has excellent mechanical strength and high reliability. Consequently, similar effects can be provided with an electronic instrument comprising the thermal detector. Preferred examples of the electronic instrument that may be cited are thermography systems that output a light (temperature) distribution image, vehicle-mounted night vision cameras, and monitoring cameras.

In accordance with at least one aspect of the present invention, it is easy to achieve a reduction in size, for example, with the thermal detector.

BRIEF DESCRIPTION OF THE DRAWINGS

Referring now to the attached drawings which form a part of this original disclosure:

FIG. 3A to FIG. 3C are drawings illustrating the production steps up until formation of the support member on the substrate;

DETAILED DESCRIPTION OF EXEMPLARY EMBODIMENTS

Preferred embodiments of the present invention are described in detail below. The embodiments described below should not be understood as unduly limiting the scope of the invention disclosed in the claims, and it will be appreciated that not all elements of the configurations described in the embodiments are essential as means for solving the problems according to the present invention.

First Embodiment

In this embodiment, there is used a support member (membrane) that has a first arm part and a second arm part, where the first arm part is provided with a plurality of wirings (n units, where n is a natural number of 2 or greater). The second arm part, on the other hand, is provided with m wirings (where $0 \leq m < n$). In this configuration, the thermal characteristic (e.g., thermal resistance per unit length) of the first arm part and the thermal characteristics of the second arm part are made to be unbalanced (in other words, there is a lack of equilibrium in the thermal characteristics of each arm part). Consequently, it is not necessary for the length of the first arm part and the length of the second arm part to be equal (equivalent lengths) when carrying out thermal design of the element.

By utilizing this feature, the arm length of the second arm part is reduced in this embodiment. By shortening the arm length of the second arm part, the surface area occupied by the second arm part is decreased, and the size of the thermal detector can be reduced in accordance therewith.

In the description presented below, a configuration is described in which two wirings (n=2) are provided in the first arm part, and no wirings (m=0) are provided in the second arm part (where this is only an example and is not to be understood as being restrictive).

Figure 1A:
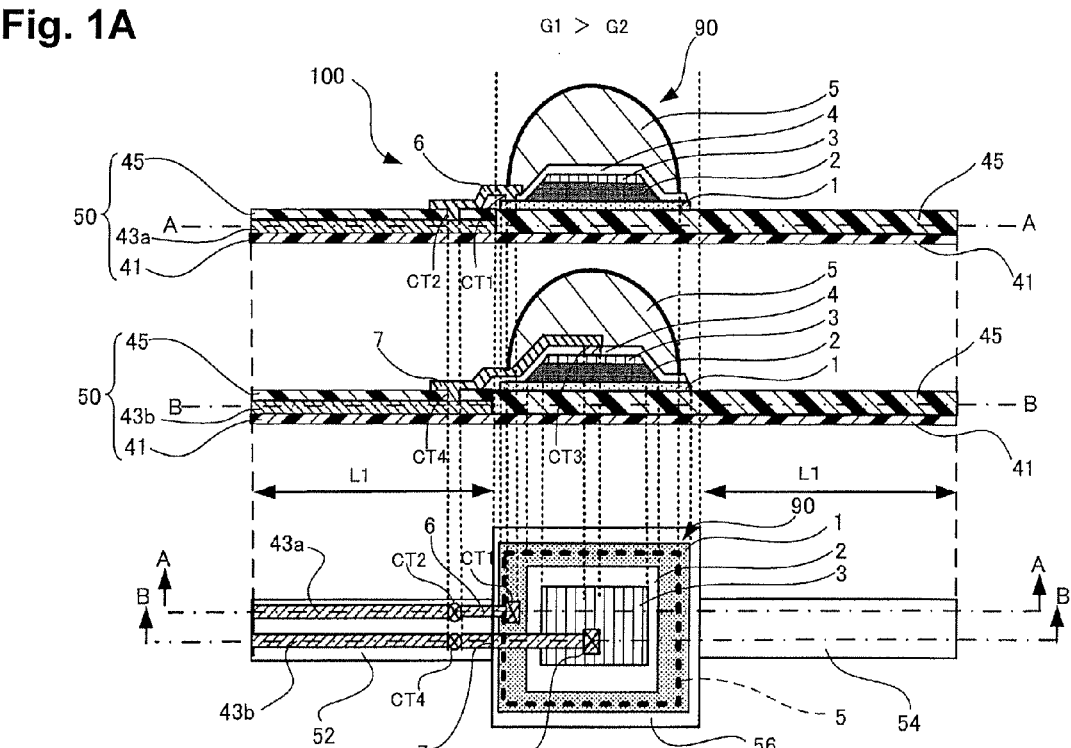
FIG. 1A to FIG. 1C are drawings illustrating a configuration of a thermal detector.
Figure 1B:
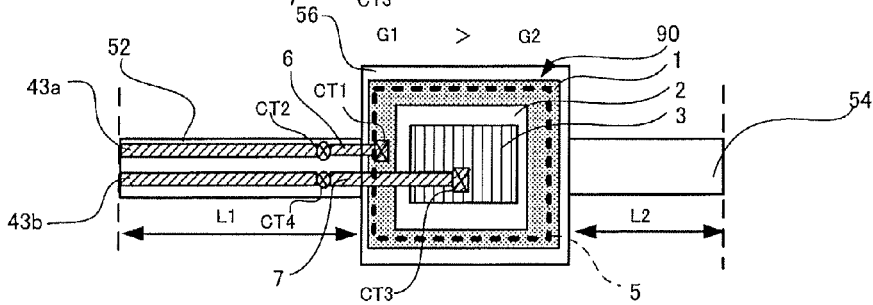
Figure 1C:
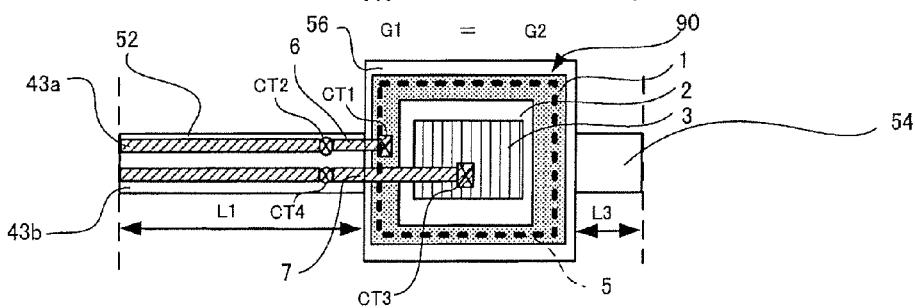

FIGS. 1A to C are drawings that illustrate examples of the configuration of the thermal detector. FIG. 1A shows an example in which the lengths of the first arm part and second arm part are the same (L1 for both), and FIGS. 1B and C show an example in which the length of the first arm is longer than the length of the second arm (L1>L2 or L1>L3). In the example of FIGS. 1B and C, the effect of reducing the size of the thermal detector (downsizing) is achieved. In the diagram, G1 shows the thermal conductance of the first arm part 52, and G2 shows the thermal conductance of the second arm part 54.

The lower drawing in FIG. 1A illustrates the shape of a thermal detector element (in this case, a pyroelectric type infrared-ray-detecting element) 90 and a support member (membrane) 50 in a thermal detector 100, as seen in plan view. The upper drawing of FIG. 1A is a sectional view across line A-A of the lower drawing. The middle drawing in FIG. 1A is a sectional view across line B-B of the lower drawing.

The thermal detector element (pyroelectric type infrared-ray-detecting element (thermal detector)) 90 has a lower electrode 1, a pyroelectric film (ferroelectric film) 2, an upper electrode 3, an insulating film (protective film) 4, and an infrared light absorbing film (e.g., a silicon oxide film) 5 used as the light-absorbing film. The lower electrode (first electrode) 1 and the upper electrode (second electrode) 3 are obtained by forming three layers of metal film, for example. There may be produced a three-layer structure composed, e.g., of a sputtered or otherwise formed iridium (Ir) layer, an iridium oxide (IrOx) layer, and a platina (Pt) layer, in order from the location furthest away from the pyroelectric film (ferroelectric film) 2. The pyroelectric film (ferroelectric film) 2 may be formed from, e.g., PZT (Pb(Zi,Ti)O$_3$: lead zirconate titanate). The pyroelectric film (ferroelectric film) 2 may be grown by a sputtering process or MOCVD process, for example. The lower electrode (first electrode) 1 and the upper electrode (second electrode) 3 have a film thickness of about 0.4 μm, for example, while the pyroelectric film (ferroelectric film) 2 has a film thickness of about 0.1 μm, for example.

In addition, a first lead wiring 6 is connected to the lower electrode 1 via a contact hole CT1. A second lead wiring 7 is also connected to the upper electrode 3 via a contact hole CT3. The first lead wiring 6 is also connected to a first wiring 43a via a contact hole CT2. The second lead wiring 7 is connected to a second wiring 43b via a contact hole CT4.

The support member (membrane) 50 has a first arm part 52, a second arm part 54, and a mounting part 56 for mounting the thermal detector 90. The thermal detector (pyroelectric type infrared-ray-detecting element) 90 is mounted on the mounting part 56. The mounting part 56 is supported by a first arm part 52 and a second arm part 54. The first arm part 52 has one end that is linked to the mounting part 56 and the mounting part 56 is supported above the substrate (not shown in FIG. 1). The second arm 54 has one end that is linked to the other end of the mounting part 56, and the mounting part 56 is supported above the substrate.

By utilizing a double-supported structure in which the mounting part 56 is supported by the first arm part 52 and the second arm part 54, flexing and twisting in each of the arm parts is suppressed, and the mounting part 56 can be more stably supported. In addition, the respective arm parts can be provided with increased support strength.

The support member (membrane) 50 can be formed from a film of at least one layer. In the example of FIG. 1A, the support member (membrane) 50 has a configuration that comprises a first insulating film 41 as a lower layer (e.g., Si$_3$N$_4$ film) and a second insulating film 45 as an upper layer (e.g., Si$_3$N$_4$ film). In addition, a plurality of wirings that electrically connect the thermal detector element 90 to the first arm part 52 (in this case, a first wiring 43a and a second wiring 43b) are provided on the first arm part 52, whereas no wirings that electrically connect to the thermal detector element 90 are provided on the second arm part 54.

In addition, the first wiring 43a and the second wiring 43b are formed so as to be embedded in the first arm part 52. In other words, the first wiring 43a and second wiring 43b are wirings that are embedded in the first arm part 52. Thus, the first arm part 52 has a first insulating film 41 that is provided towards the substrate (bottom), a first wiring 43a and second wiring 43b that are electrically isolated from each other and are provided on the first insulating film 41, and a second insulating film 45 that is provided on the first wiring 43a and the second wiring 43b.

When each of the first wiring 43a and the second wiring 43b is provided on the first arm part 52, it is necessary also to form an insulating film (protective film) thereupon. Consequently, the heat capacity of the first arm part increases. By embedding the first wiring 43a and the second wiring 43b in an interior part of the first arm part 52, the insulating films 41, 45 that constitute the first arm part 52 also serve as a protective film for the wirings. Thus, it is not necessary to provide a separate insulating film for protecting the wirings, and the heat capacity of the support member (membrane) 50 can be decreased accordingly. The wirings 43a and 43b, for example, can be constituted by the metal that is used as the conductor layer, e.g., aluminum (Al), tungsten (W), or the like.

In the example of FIG. 1A, the respective lengths of the first arm part 52 and the second arm part 54 are set at L1, but in this example, the effect of downsizing the thermal detector 100 is not realized. No problems will arise, however, if the length of the second arm part 54 is additionally shortened, because the second arm part 54 is formed only from an insulating film and thus has a small thermal conductance relative to the first arm part 52 that includes metal having favorable thermal conductivity.

In other words, it is not necessary for the lengths of the first arm part 2 and the second arm part 54 to be the same. As with the example of FIGS. 1B and 1C, the length of the second arm part 54 is set shorter than the length of the first arm part 52, thereby producing the effect of reducing the size of the thermal detector 100. In the examples of FIGS. 1B (and 1C), the first arm part 52 and the second arm part 54 are asymmetrical in regard to length. A detailed description is presented below concerning the example of FIGS. 1B and 1C.

Because the wirings 43a, 43b (conductive material (e.g., metal; typically also having high thermal conductivity)) are provided only on the first arm part 52, the thermal conductance G1 of the first arm part 52 will be greater than the thermal conductance G2 of the second arm part 54 that is formed only from the insulators 41, 45. Consequently, the heat dissipation of the first arm part 52 will be predominant, and design of the thermal detector element can be carried out based only on the heat dissipation characteristics (thermal conductance G1) of the first arm part 52. The first arm part 52 thus manifests the desired thermal conductance G1 that reduces thermal diffusion to the substrate, and thus it is necessary for the arm length L1 to be long, to some degree.

On the other hand, the thermal conductance per unit length of the second arm part 54, which is formed only from electrically insulating material (e.g., silicon oxide film or silicon nitride film), is smaller than the thermal conductance per unit length of the first arm part 52. Thus, no advantage is gained in keeping the second arm part 54 the same length as the first arm part 52, and making the level of thermal resistance greater than a necessary level. In other words, despite the thermal characteristics being predominantly governed by the first arm part 52, having a high level of thermal resistance imparted by the second arm part 54 will not be effective in minimizing heat dissipation. Thus, the length of the second arm part 54 can be shorter than the length L1 of the first arm part 52. The shortest possible length is a length L3 at which the thermal conductance G2 of the second arm part 54 becomes equivalent to the thermal conductance G1 of the first arm part 52. In other words, if the length of the second arm part 54 is below L3, then the heat dissipation characteristics of the second arm part 54 will become predominant, and thermal design cannot be carried out based on the first arm part 52.

Consequently, the relationship G1≥G2 obtains between the thermal conductance G1 of the first arm part 52 and the thermal conductance G2 of the second arm part 54. In other words, the second arm part 54 can be shorter than the first arm part 52, under the condition that the thermal conductance G2 of the second arm part 54 not be greater than the thermal conductance G1 of the first arm part 52. In other words, the arm length of the second arm part 54 can be shortened within a range in which the condition G1≥G2 is satisfied.

In the example of FIG. 1B, the length of the second arm part 54 is set at L2. In this case, the length L1 of the first arm part 52, the length L2 of the second arm part 54, and the length L3 at which the thermal conductance G2 of the second arm part 54 is equivalent to the thermal conductance G1 of the first arm part 52 exist in the relationship L1>L2>L3. The relationship G1>G2 obtains between the thermal conductance G1 of the first arm part 52 and the thermal conductance G2 of the second arm part 54.

In the example of FIG. 1C the length of the second arm part 54 is set to L3. In other words, the length of the second arm part 54 is set at the minimum. The thermal conductance G1 of the first arm part 52 and the thermal conductance G2 of the second arm part 54 thus have the relationship G1=G2.

In the example of FIGS. 1B and 1C, the surface area occupied by the second arm part 54 is decreased by shortening the arm length of the second arm part 54. The size of the thermal detector 100 can be additionally decreased in conjunction therewith. Adoption of the example of FIG. 1B or the example of FIG. 1C can be decided appropriately in consideration of design parameters other than heat.

In the above example, because wirings (a conductor layer) are not provided on the second arm part 54, the thermal conductance of the second arm part 54 will be sufficiently small. Consequently, in the example of FIG. 1C, the length L3 of the second arm part 54 can be made sufficiently small, and thus significant downsizing of the element is possible.

Moreover, although it is preferable from the standpoint of design of the thermal detector 100 for the constituent material and sectional surface area of the first arm part 52 and second arm part 54 to be the same, this relationship is not restrictive, as there may be differences in constituent materials and sectional surface areas between each of the arms. In this case as well, the effect of downsizing of the thermal detector 100 can be achieved, provided that the condition is satisfied that the lengths (L2, L3) of the second arm part 54 are shorter than the length (L1) of the first arm part 52.

Figure 2A:
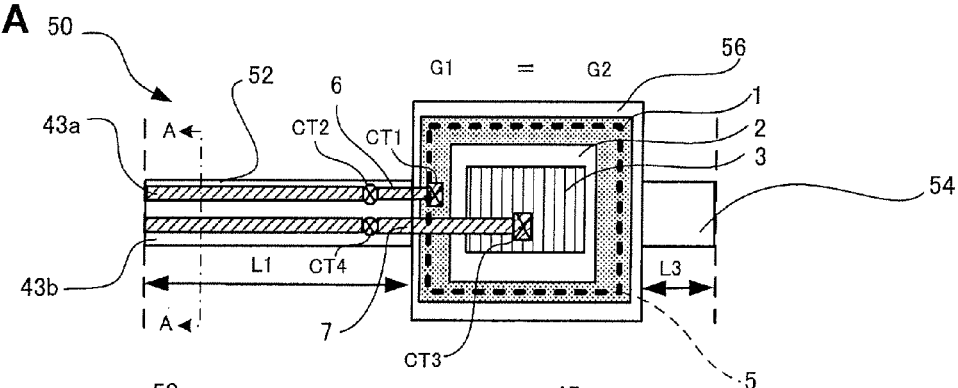
FIG. 2A to FIG. 2F are drawings showing an example of the sectional structure of a first arm part and drawings showing an example of a method of manufacturing the support member (membrane)
Figure 2B:
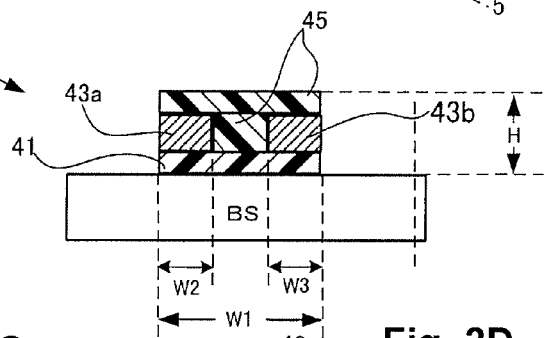

FIGS. 2A to 2F are drawings that illustrate an example of the sectional structure of the first arm part and an example of a production method for the support member (membrane). FIG. 2B is a sectional view across line A-A of the support member 50 shown in FIG. 2A (same as the member shown in FIG. 1C). In other words, the sectional structure of the first arm part 52 in the support member (membrane) 50 is shown in FIG. 2B. The first arm part 52 is formed on the substrate BS. The width of the first arm part 52 is W1, and the height is H. The widths of the first wiring 43a and the second wiring 43b that are embedded in the first arm part 52 are W2 (where W1>W2).

Figure 2C:
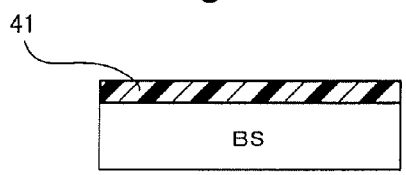
Figure 2D:
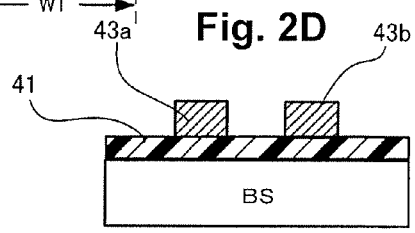
Figure 2E:
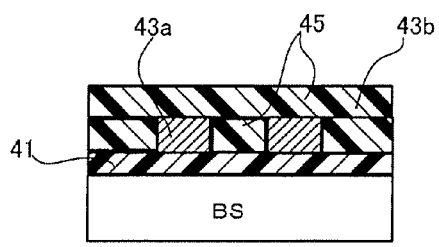
Figure 2F:
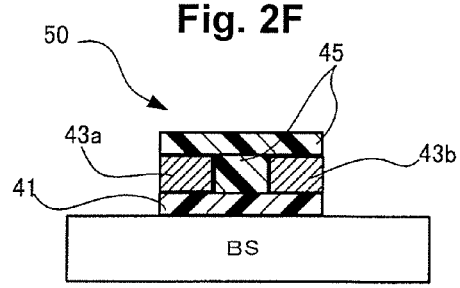

The production method for the support member (membrane) 50 will be described below using FIGS. 2 C to 2F. As shown in FIG. 2C, a first insulating film (e.g., an $Si_3N_4$ film) 41 is formed on a substrate BS (substrate broadly defined, where the substrate BS also includes insulating films and the like that are formed on substrates narrowly defined (e.g., silicon substrates). Next, as shown in FIG. 2D, a metal layer such as aluminum is formed on the first insulating film 41, and then patterning is carried out to form a first wiring (first wiring layer) 43a and a second wiring (second wiring layer) 43b. As described above, the first wiring 43a and the second wiring 43b are provided only in the first arm part 52. Next, as shown in FIG. 2E, a second insulating film (e.g., $Si_3N_4$ film) 45 is formed on the first wiring 43a and the second wiring 43b. Next, as shown in FIG. 2F, the first insulating film 41 and the second insulating film 45 are patterned. As a result, a support member (membrane) 50, as shown in FIG. 2A, is formed (including the first arm part 52, the second arm part 54, and the mounting part 56).

A description concerning the production process for the thermal detector as a whole is presented below in reference to FIGS. 3 and 4. FIGS. 3A to 3C are diagrams showing the production process up to formation of the support member on the substrate. FIGS. 4A and 4B are drawings showing the process up until formation of the thermally isolated thermal detector element (pyroelectric type infrared-ray-detecting element) on the support member.

In the process shown in FIG. 3A, a surface protective film 15 (e.g., $SiO_2$ film) is formed on a silicon substrate 11, and an insulating film 13 (e.g. $SiO_2$ film) having a prescribed thickness is formed by CVD or the like. Next, a silicon nitride film ($Si_3N_4$ film) is formed on the insulating film 13, and this silicon nitride film ($Si_3N_4$ film) is patterned to form a depression part 17. This cavity 15 functions as a thermal isolation cavity for thermally isolating the mounting part 56 in the support member 50 from the substrate BS. In addition, the silicon nitride films ($Si_3N_4$ films) Qa and Qb that remain after patterning function as supports that directly support the support member 50. Next, a titanium nitride (TiN) film ES is formed on the silicon nitride films ($Si_3N_4$ films) Qa and Qb, on the side surfaces of the silicon nitride films ($Si_3N_4$ films) Qa and Qb, and on the insulating film ($SiO_2$ film) 13. This titanium nitride (TiN) film ES functions as an etching stopper film when forming the cavity for thermal isolation (reference symbol 17 in FIG. 4B).

In the process of FIG. 3B, after forming a sacrificial layer (e.g., $SiO_2$ film) over the entire surface, etch-back or CMP is carried out in order to embed the sacrificial layer in the recess part 17. A sacrificial layer 10 that is embedded in the recess part 17 is thus formed.

In the process of FIG. 3C, a support member (membrane) 50 (including the first wiring 43a and the second wiring 43b) is formed. The support member (membrane) 50 is formed by the various steps shown previously in FIG. 2C to 2F.

Figure 4A:
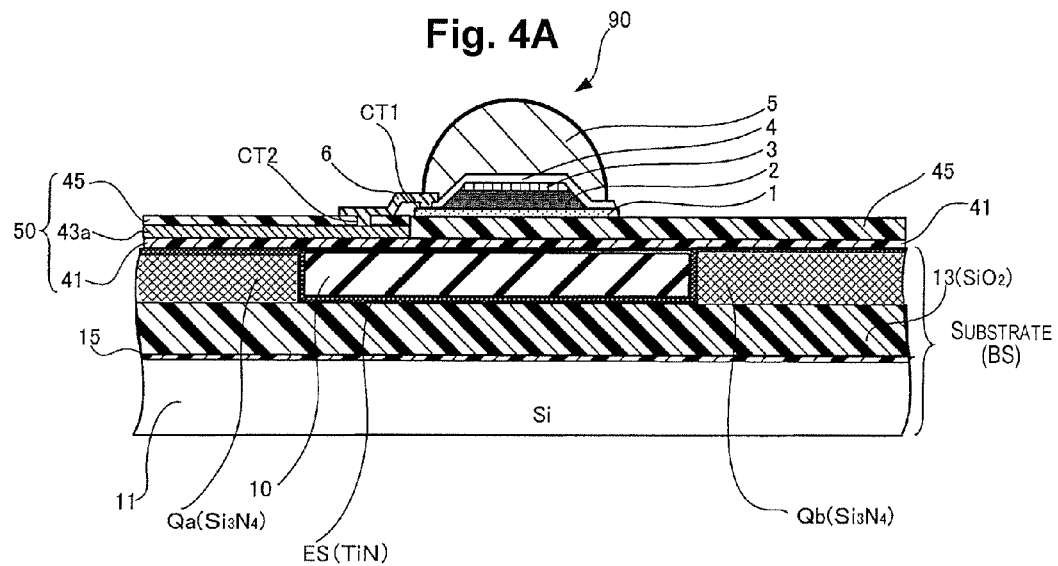
FIG. 4A and FIG. 4B are drawings illustrating the steps up until formation of a thermally isolated thermal type detector element (pyroelectric type infrared-ray-detecting element) on the support member.
Figure 4B:
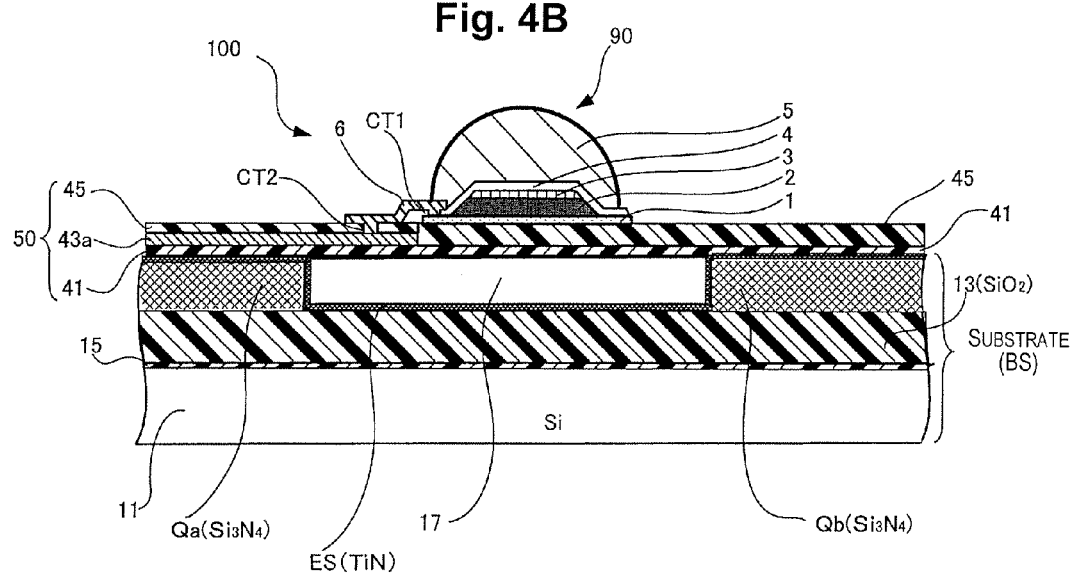

FIGS. 4A and 4B will be referenced next. In the process of FIG. 4A, a lead wiring 6 and an infrared-ray-detecting element 90 that is used as thermal detector are formed on the support member (membrane) 50.

As described previously, the pyroelectric type infrared-ray-detecting element 90 has a lower electrode 1, a pyroelectric film (ferroelectric film) 2, an upper electrode 3, an insulating film (protective film) 4, and an infrared absorbing film (e.g., silicon oxide film) 5 used as a light-absorbing film.

The lower electrode (first electrode) 1 and the upper electrode (second electrode) 3 are obtaining by forming three layers of metal film, for example. There may be produced a three-layer structure composed, e.g., of a sputtered or otherwise formed iridium (Ir) layer, an iridium oxide (IrOx) layer, and a platina (Pt) layer, in order from the location furthest away from the pyroelectric film (ferroelectric film) 2. The pyroelectric film (ferroelectric film) 2 may be formed from, e.g., PZT (Pb(Zi,Ti)O$_3$: lead zirconate titanate). The pyroelectric film (ferroelectric film) 2 may be grown by a sputtering process or MOCVD process, for example. The lower electrode (first electrode) 1 and the upper electrode (second electrode) 3 have a film thickness of about 0.4 µm, for example, while the pyroelectric film (ferroelectric film) 2 has a film thickness of about 0.1 µm, for example.

The production method is described below. First, the lower electrode 1, the pyroelectric film 2, and the upper electrode 3 are formed in sequence. Next, the insulating film (protective film) 4 is formed. Next, the insulating film (protective film) 4 is patterned to form contact holes (CT1, CT3 in FIGS. 1A to 1C). In addition, a second insulating film 45 is patterned in the first arm part 52 to form contact holes (CT2, CT4 in FIGS. 1A to 1C).

Next, a layer is formed from a metal such as aluminum, and this metal layer is patterned to form a lead wiring 6 (and 7). Next, an SiO$_2$ film is formed over the entire surface, and this SiO$_2$ film is patterned to form a light-absorbing film (infrared absorbing film) 5.

In the step of FIG. 4B, the sacrificial layer 10 is removed, thereby forming the cavity (recess part) 17 used for thermal isolation.

The thermal detector (infrared detector) 100 of this embodiment has asymmetrical arm lengths in each of the arm parts, and the arm length of one arm is shortened, thereby reducing size. In addition, because the mounting part has a structure that is supported at both ends, it has excellent mechanical strength. Consequently, an infrared detector or the like having high reliability can be achieved.

Second Embodiment

Figure 5:
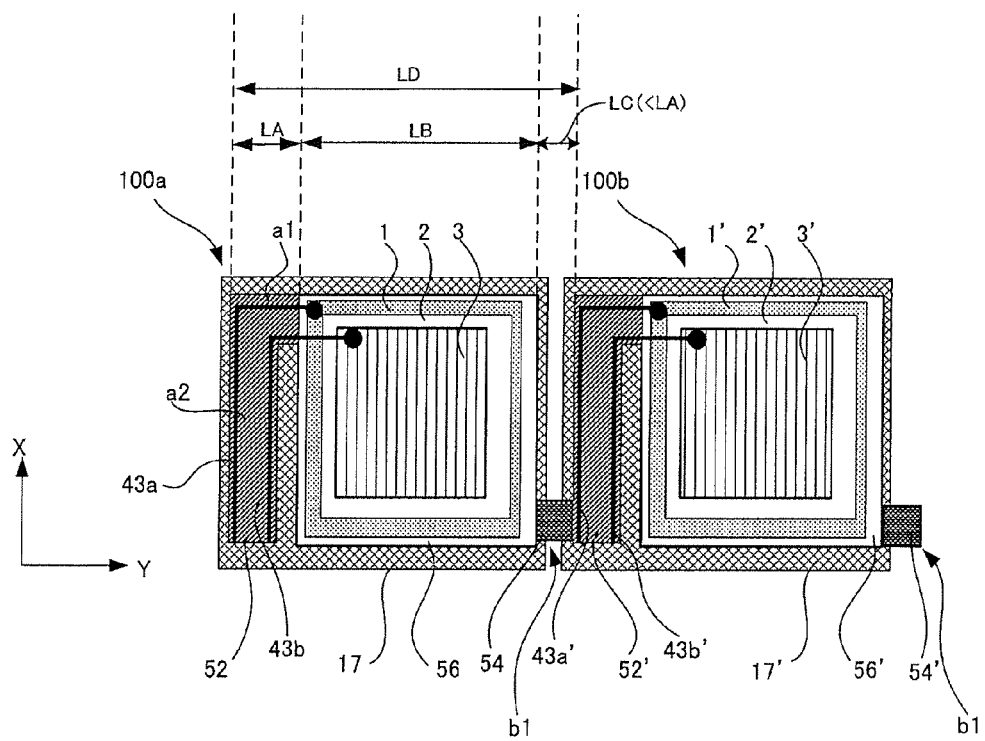
FIG. 5 is a plan view showing an example of a thermal detector having an arm shape suitable for a thermal detector array.

In this embodiment, an example will be described in regard to an arm shape that contributes to improving the degree of integration (in other words, array downsizing) in a thermal type thermal detector array in which a plurality of thermal detectors are arranged two-dimensionally. FIG. 5 is a plan view showing an example of a thermal detector having an arm shape that is suitable for a thermal detector array. In FIG. 5, the same reference symbols are used for the same parts as in the previous embodiment.

In FIG. 5, two thermal detectors 100*a*, 100*b* are arranged in the x-axis direction (first direction). The shapes of the thermal detector 100*a* and 100*b* are the same, as seen in plan view. In FIG. 5, prime marks are added to the reference symbols for the thermal detector 100*b*. In addition, in the example of FIG. 5, cavities 17, 17' used for thermal isolation are provided respectively opposite the thermal detectors 100*a* and 100*b*.

In the first embodiment, the first arm part 52 and the second arm part 54 extend in mutually perpendicular directions from the mounting part 56, but in this embodiment (second embodiment), the first arm part 52 has a curved shape, whereas the second arm part 54 has a straight shape. The thermal conductance G1 of the first arm part 52 and the thermal conductance G2 of the second arm part 54 are set so as to be equal, for example (example of FIG. 1C).

In the thermal detector 100*a*, the first arm part 52 has a first portional that is linked to the mounting part 56 and extends in a first direction (x-axis direction) as seen in a plan view and a second portion a2 that is connected to the first portional and extends in a second direction (Y-axis direction) that is perpendicular to the first direction (x-axis direction). On the other hand, the second arm part 54 has only a third portion b1 that extends in the first direction (x-axis direction).

The dimensions in the first direction (x-axis direction) of each of the parts in the thermal detector 100*a* are shown at the top left in FIG. 5. The dimension of the first arm part 52 in the first direction (x-axis direction) is LA, the dimension of the mounting part 56 in the first direction (x-axis direction) is LB, and the dimension of the second arm part 54 in the first direction (x-axis direction) is LC, where LC<LA. The overall dimension of the thermal detector 100*a* in the first direction (x-axis direction) is LD (LD=LA+LB+LC).

As described previously, the first arm part 52 must have a longer arm length in order to inhibit thermal diffusion to the substrate BS. The thermal conductance of the arm part is determined as the product of a constant determined based on the material properties of the constituent material, the sectional surface area, and the length. The constant is established by definition, provided that the material properties have been determined, and the surface area is determined based on the required strength of the arm part and the processing conditions, and the like. Consequently, there are limitations on decreasing the sectional surface area. It is thus necessary to achieve the desired thermal conductance G1 by increasing the arm length, thereby increasing the thermal resistance. In this embodiment, the shape of the first arm part 52 is curved, so that the arm length can be increased while restricting the dimension in the first direction (x-axis direction), thereby obtaining the desired thermal conductance G1.

In other words, the first arm part 52 includes the first portional that extends in the first direction (x-axis direction) and the second portion a2 that extends in the second direction (y-axis direction) that is perpendicular to the first direction as seen in plan view. Consequently, the two-dimensional space is effectively utilized, and the arm length in the first direction (x-axis direction) is controlled, thereby allowing the thermal conductance G1 of the first arm part 52 to fall within the allowed range. The second arm part 54, on the other hand, may be short, and thus it is sufficient to use only the third portion b1 that extends in the first direction (x-axis direction).

The shape of the support member in this embodiment (including the mounting part 56, the first arm part 52, and second arm part 54 that support it), as seen in plan view, is compact and has favorable mechanical balance, thereby inhibiting twisting, flexing, and the like. Moreover, because two metal wirings having high rigidity are provided in the first arm part 52 that has the longer arm length, sufficient mechanical strength is obtained. The second arm part 54, on the other hand, is composed only of an insulating film, and because the arm length is short, it does not readily undergo flexing or the like. Consequently, there are no problems from the standpoint of mechanical strength. A large-scale thermal detector array can thus be readily formed by using this structure as a unit (cell).

The plurality of thermal detectors in this embodiment are arranged two-dimensionally (e.g., in an array along two mutually perpendicular axes), allowing a thermal detector device (thermal type photoarray sensor) with high integration levels to be produced.

Third Embodiment

Figure 6:
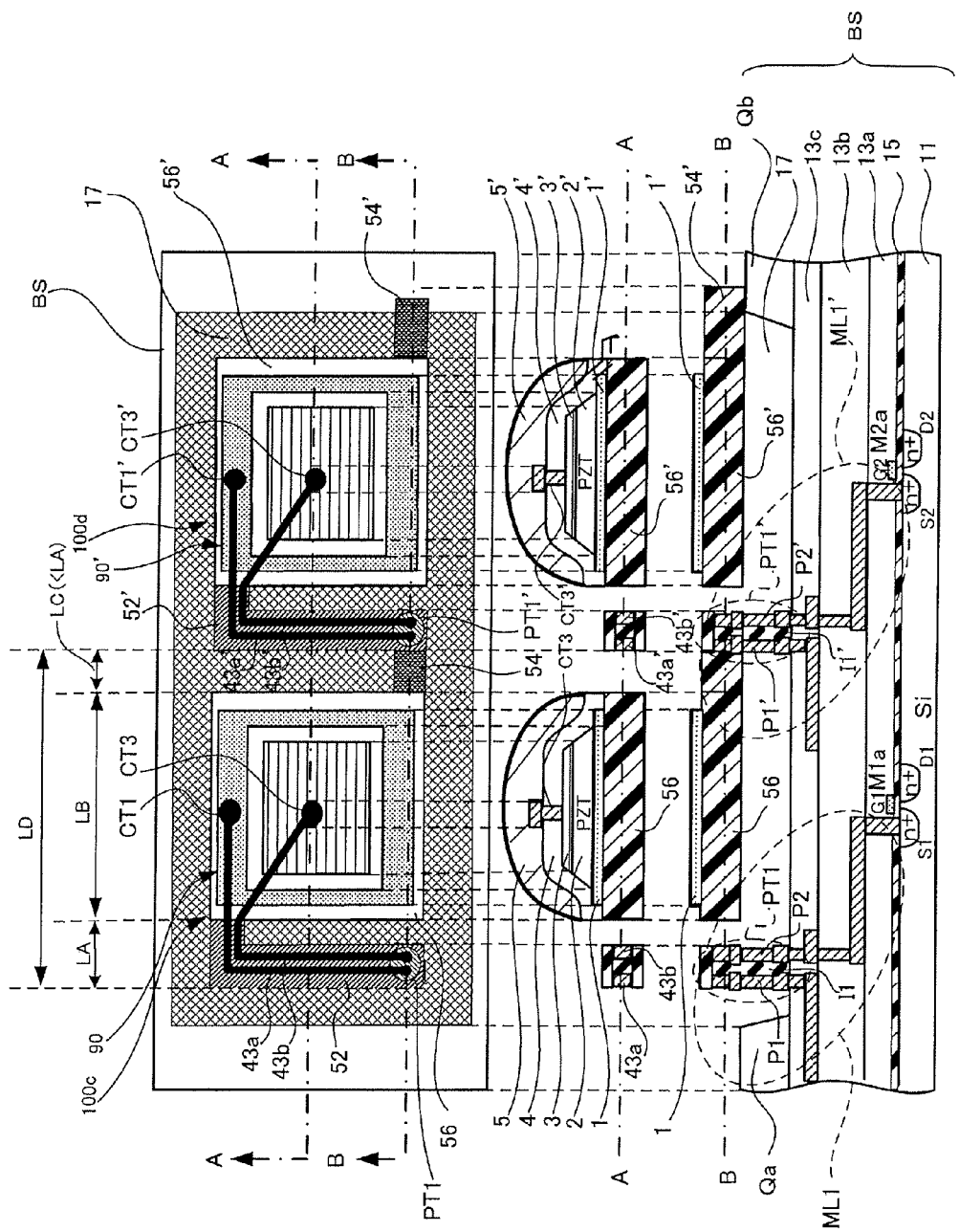
FIG. 6 is a plan view showing another example of a thermal detector having an arm shape suitable for a thermal detector array.

This embodiment describes another example of arm shape that will contribute to increasing the integration level (e.g., array downsizing) of a thermal detector array in which a plurality of thermal detectors are arranged two-dimensionally. FIG. 6 is a plan view showing another example of a thermal detector having an arm shape suitable for use in a thermal detector array. In the upper diagram of FIG. 6, the shape of the thermal detectors 100c and 100d is shown as seen in plan view. The middle diagram of FIG. 6 is a sectional view of the upper diagram across line A-A. The lower level of FIG. 6 is a sectional view of the upper diagram of FIG. 6 across line B-B. In FIG. 6, the same reference symbols are used for the same parts as in the previous embodiments. A prime mark is also attached to the constituent elements of the thermal detector 100d.

In the thermal detectors 100c and 100d shown in FIG. 6, the shape of the arm part as seen in plan view is the same as in the second embodiment. However, the positions of the contact holes (CT1, CT3, CT1', CT3') for connecting the lead wirings to the upper electrode of the thermal detector element are slightly different from those in the second embodiment.

In addition, in this embodiment, the thermal detectors 100c and 100d are formed on a shared cavity 17 (in the second working example, cavities were formed for each of the detectors). This feature contributes to simplifying the production processes. In this embodiment, support posts PT1, PT1' are used in order to keep each of the thermal detectors 90, 90' (or the mounting parts 56, 56') above the shared cavity 17 in a condition whereby they are lifted upwards from the substrate BS. The support posts PT1, PT1' also function as contact wirings (contact plugs) for electrically connecting each of the first and second wirings provided on the first arm part with circuit-constituent elements provided in a region of the substrate BS below the cavity 17.

In other words, the first arm part 52 that constitutes at least one of the thermal detectors (e.g., 90) of the plurality of thermal detectors 90, 90', ... provided on the shared cavity 17 is supported by a post PT1 that protrudes from the bottom part (bottom surface) of the cavity towards the thermal detector 90 (i.e., upwards). The post PT1 includes a conductor layer (contact plug P1 and contact plug P2) that is electrically connected to at least one of the plurality of wirings 43a, 43b provided on the first arm part 52 and a circuit-constituting element (NMOS transistor M1a) provided in a region of the substrate BS that overlaps with the shared cavity 17 as seen in plan view. The same is true for the post P1'. The post PT1 (PT1') is used as a contact wiring; therefore, it is not necessary to provide a separate contact wiring, which allows the thermal detector 90 (90') to be more compact, while also simplifying the production process.

In addition, by providing the circuit-constituting elements (M1a, M2a, etc.) in a region of the substrate BS that is situated under the shared cavity 17, the required circuits can be formed without increasing the occupied surface area. By using the shared cavity 17, the structural burden thus can be reduced, and the thermal detector device can also be made more compact.

Moreover, when a thermal detector 90 is used as the first thermal detector, and a thermal detector 90' is used as the second thermal detector, for example, a shared post PT1' can be used in order to support both the second arm part 54 of the first thermal detector 90 and the first arm part 52' of the second thermal detector 90'.

As a result, the two arm parts (respective arm parts being the arm parts of different thermal detectors) can be supported by a single post, and the number of posts can thus be decreased. Consequently, the burden can be reduced from the standpoint of element production. Moreover, by decreasing the number of posts, heat dissipation from the element to the substrate can be effectively suppressed. In the example of FIG. 6, the first thermal detector 90 and the second thermal detector 90' are arranged adjacent to each other.

The specific structure of the device will be described below in reference to the lower drawing in FIG. 6. The support posts PT1, PT1' (circumscribed by a dotted line) are formed using a multilayer wiring structure. The support post PT1 is constituted by a contact plug P1 that is electrically connected with the first wiring 43a, a contact plug P2 that is electrically connected with the second wiring 43b, and an interlayer insulating film I. Similarly, the support post PT1' is constituted by a contact plug P1' that is electrically connected with a first wiring 43a', a contact plug P2' that is electrically connected with a second wiring 43b', and an interlayer insulating film I'.

In addition, N-type MOS transistors M1a, M2a which are circuit constitutive elements are formed on the silicon substrate (narrowly-defined substrate) 11 located below the shared cavity 17. The N-type MOS transistor M1a is provided correspondingly with respect to the thermal detector 90, and the N-type MOS transistor M2a is provided correspondingly with respect to the thermal detector 90'. The N-type MOS transistor M1a has a gate G1 (e.g., a silicon gate), a source layer ($n^+$) 51, and a drain layer ($n^+$) D1. Similarly, the N-type MOS transistor M2a has a gate G2 (e.g., a silicon gate), a source layer ($n^+$) S2, and a drain layer ($n^+$) D2.

The N-type MOS transistor M1a and the thermal detector 90 are connected by a conductor layer ML1 having multilayer wiring. The N-type MOS transistor M2a and the thermal detector 90' are also connected by a conductor layer ML1' having multilayer wiring.

Figure 7:
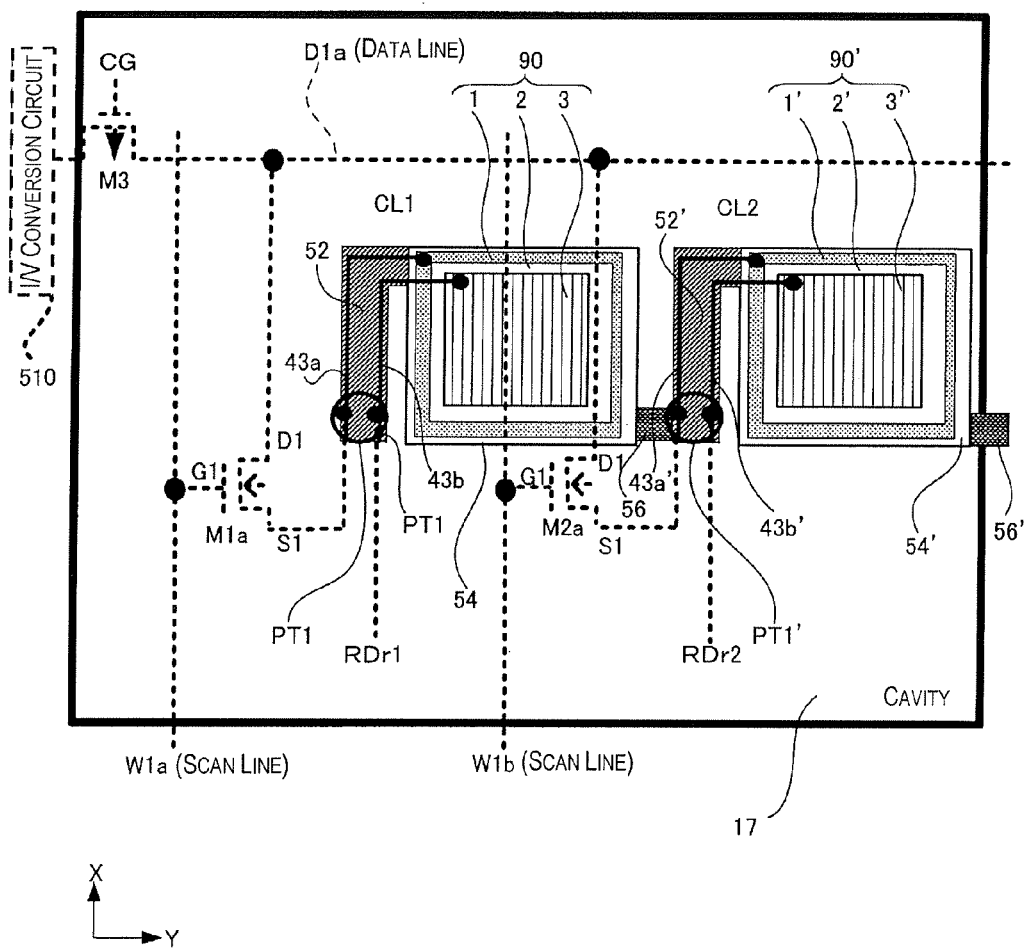
FIG. 7 is a drawing showing an example of a configuration of a circuit that is provided on the substrate in the example of FIG. 6.

FIG. 7 is a drawing showing a configuration example of the circuit provided on the substrate in the example of FIG. 6. The gate G1 of the N-type MOS transistor (selective transistor) M1a is connected to a scan line W1a. The source S1 of the N-type MOS transistor (selective transistor) M1a is connected to the first wiring 43a. The drain D1 of the N-type MOS transistor (selective transistor) M1a is connected to a data line D1a.

The gate G2 of the N-type MOS transistor (selective transistor) M2a is connected to a scan line W1b. The source S2 of the N-type MOS transistor (selective transistor) M2a is connected to the first wiring 43a'. The drain D2 of the N-type MOs transistor (selective transistor) M2a is connected to a data line D1a.

In addition, a prescribed voltage (a voltage whose voltage level can be varied step-wise) is applied to the second wiring 43b of the thermal detector 90. In addition, a prescribed voltage (a voltage whose voltage level can be varied step-wise) PDr2 is applied to the second wiring 43b' of the thermal detector 90'.

The data line D1a is connected to one end of a read transistor M3. The other end of the read transistor M3 is connected to an I/V conversion circuit 510. The ON/OFF of the read transistor M3 is controlled by a control voltage CG that is applied to the gate.

In the example of FIG. 7, transistors M1a, M1b which are circuit-constituting elements are formed in a region of the substrate BS that overlaps with the cavity 17, as viewed from a plan view. In addition, part of the scan lines W1a, W1b and part of the data line D1a are formed therein. The diodes and passive elements (resistors, etc.) are also formed on the substrate BS as circuit-constituting elements.

The circuit-constituting elements that relate to the thermal detector (passive elements such as resistors and active elements such as transistors) are provided on the substrate BS in a region that overlaps with the cavity 17 as seen in plan view (i.e., a region situated under the cavity 17). As a result, the circuit-constituting elements can be integrated in the substrate without increasing the surface area of the cell. This technology contributes, for example, to achieving scale-down in the configuration of a large-scale array.

Fourth Embodiment

Figure 8:
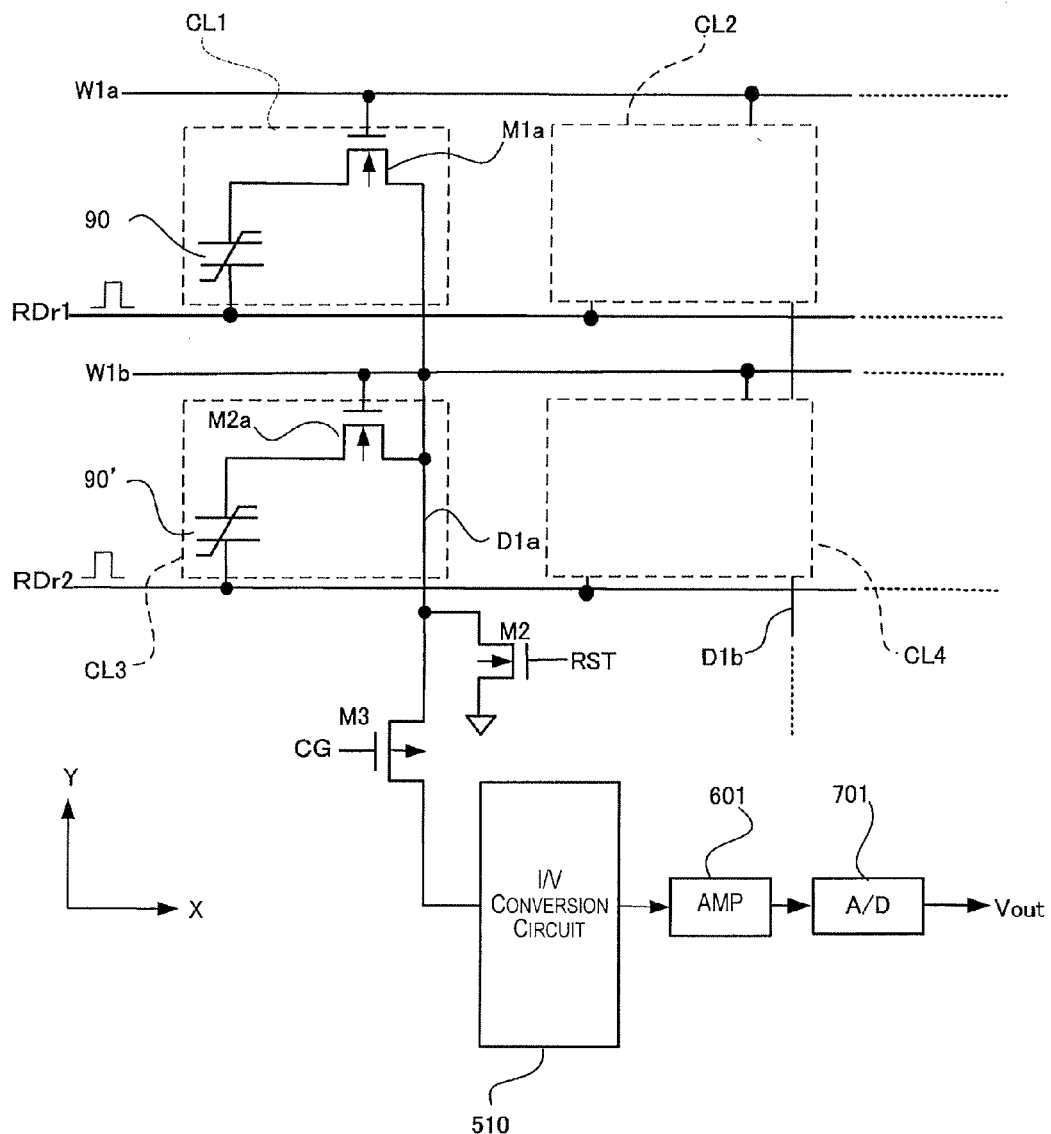
FIG. 8 is a circuit diagram showing an example of a circuit configuration of a thermal detector device (thermal detector array)

FIG. 8 is a circuit diagram showing an example of a circuit configuration of the thermal detector device (thermal detector array). In the example of FIG. 8, a plurality of photodetector cells (CL1 to CL4, etc.) are arranged two-dimensionally. Scan lines (W1a, W1b, etc.) and data lines (D1a, D1b, etc.) are provided in order to select the photodetector cells from among the plurality of photodetector cells (CL 1 to CL4, etc.) The configuration described previously in relation to FIG. 7 can be adopted as the configuration for the cell CL1 and the cell CL3.

The photodetector cell CL1 has a thermal detector element 90 (piezoelectric capacitor) and an element selection transistor M1a. The potential relationship of the two poles of the thermal detector element 90 (voltage capacitor) can be inverted by switching the voltage level of the voltage PDr1 (carrying out this voltage inversion eliminates the need for designing a mechanical chopper). The photodetector cell CL2 has a comparable configuration (the other photodetector cells also have comparable configurations).

The potential of the data line D1a can be initialized by turning on a reset transistor M2. When reading out a sensor signal, a readout transistor M3 is turned on. Electrical current produced through the pyroelectric effect is converted to voltage by an I/V conversion circuit 510, amplified by an amp 600, and then converted to digital data by an A/D converter 701.

The present embodiment affords a thermal detector device (thermal type light array sensor) in which a plurality of thermal detectors (thermal detector elements) are arranged two-dimensionally (for example, arranged in arrays along two orthogonal axes (an X axis and a Y axis)).

Fifth Embodiment

Figure 9:
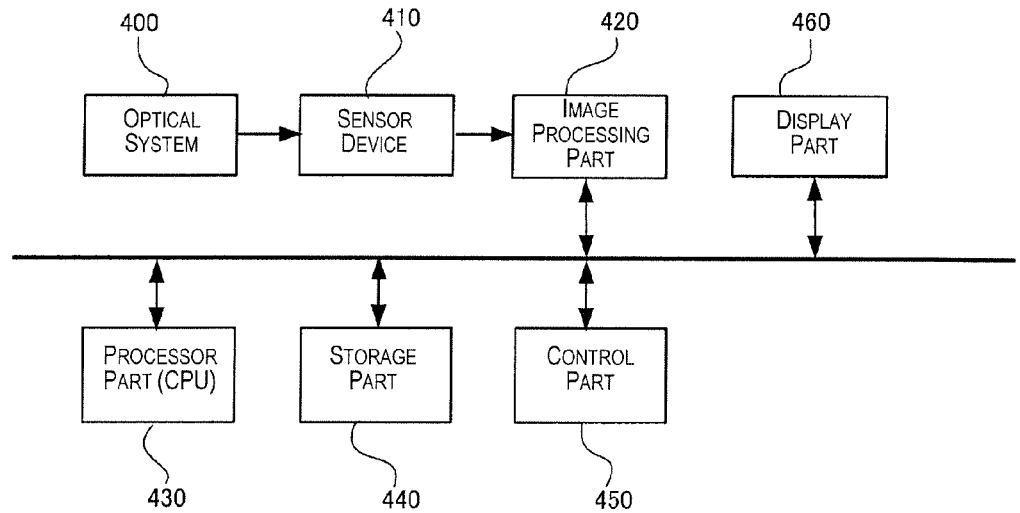
FIG. 9 is a drawing showing an example of a configuration of an electronic instrument.

FIG. 9 is a drawing that illustrates an example of the configuration of an electronic instrument. The electronic instrument of FIG. 9 is, for example, an infrared camera. As shown in the drawing, the electronic instrument includes an optical system 400, a sensor device (thermal detector device) 410, an image processing part 420, a processor part 430, a storage part 440, a control part 450, and a display part 460. The electronic instrument of the present embodiment is not limited to the configuration of FIG. 15, and various other modified embodiments in which some of the constituent elements thereof (e.g., the optical system, the control part, the display part, and so on) are omitted, or other constituent elements are added, are also possible.

The optical system 400 includes, for example, one or several lenses, a drive part for driving these lenses, and so on, and carries out formation of an object image on the sensor device 410, etc. The system may also carry out focus adjustment if needed.

The sensor device 410 is composed of photodetectors according to the preceding present embodiment in a two-dimensional arrangement, and is furnished with a plurality of row lines (scan lines (or word lines)) and a plurality of column lines (data lines). In addition to the two-dimensionally arrayed photodetectors, the sensor device 410 may include a row select circuit (row driver), a readout circuit for reading out data from the photodetectors via the column lines, an A/D converter, and the like. An imaging process of an object image can be carried out by sequentially reading out data from the two-dimensionally arrayed photodetectors.

On the basis of digital image data (pixel data) from the sensor device 140, the image processing part 420 carries out image processing of various kinds, such as image correction processes. The processor part 430 carries out control of the electronic instrument as a whole, or control of blocks within the electronic instrument. This processor part 430 is configured using a CPU, for example. The storage part 440 is used to store information of various kinds, and functions as a work area for the processor part 430 and the image processing part 420, for example. The control part 450 is an interface allowing a user to control the electronic instrument, and may be configured, for example, through various types of buttons, GUI (graphical user interface) screens, or the like.

The display section 460 is used to display, for example, images acquired by the sensor device 410, GUI screens, and the like, and may be configured through various types of display devices such as a liquid crystal display or an organic EL display.

In this way, besides using a single cell-equivalent thermal detector device as a sensor such as an infrared sensor, the sensor device 410 (thermal detector device) may be constituted by a two-dimensional arrangement of single cell-equivalent thermal detector devices along two orthogonal axial directions, whereby images of temperature (or light) distribution may be provided. Such a sensor device 410 may be utilized to build electronic instruments such as thermography systems, or vehicle-mounted night vision or monitoring cameras.

As described above, the thermal detector is small, and the mounting part has a double-supported structure affording superior mechanical strength and high reliability. Consequently, electronic devices that contain these thermal detectors are provided with similar effects. Preferred examples of electronic devices are thermography systems that output light (temperature) distribution images, vehicle-mounted night vision cameras, and monitoring cameras.

Sixth Embodiment

Figure 10:
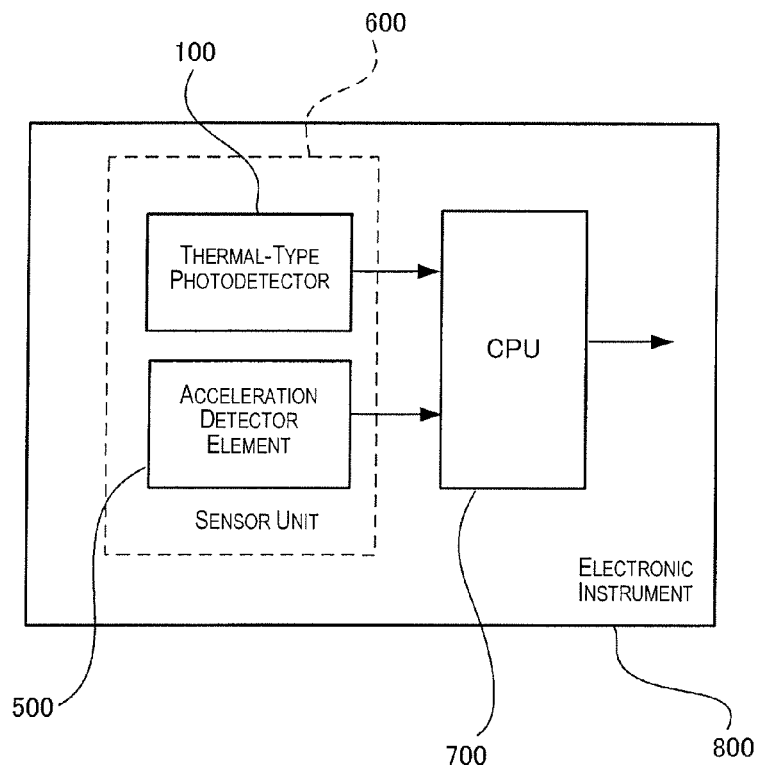
FIG. 10 is a drawing showing another example of a configuration of an electronic instrument.

FIG. 10 is a drawing that illustrates another example of the configuration of an electronic instrument. The electronic instrument 800 of FIG. 10 has a sensor unit 500 on which are mounted a thermal detector 100 and an acceleration detector element 500. A gyro sensor or the like can also be mounted on the sensor unit 500. Various types of physical quantities can be measured as a result of using the sensor unit 500. The various detection signals that are output by the sensor unit 500 are processed by a CPU 700.

While only selected embodiments have been chosen to illustrate the present invention, it will be readily apparent to those skilled in the art from the novel matters and effects of the present invention that numerous modifications may be made herein without substantially departing from the scope of the invention. Consequently, all modifications such as the above may be understood to fall within the scope of the invention. Terms disclosed together with different equivalent or broader terms in at least one instance in the specification or drawings, for example, may be replaced by these different terms at any place in the specification or drawings. For example, there are various possible modifications in relation to the constituent materials of the support member (membrane) and its formation method, and the like.

According to at least one embodiment of the present invention, it is possible, for example, to readily reduce the size of the thermal detector. The present invention can be widely used in various types of thermal detectors (e.g., thermocouple elements (thermopiles), pyroelectric type elements, and bolometers). There are no restrictions on the wavelength of the light to be detected.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A thermal detector comprising:
   a substrate;
   a thermal detector element having a light-absorbing film;
   a support member having
      a mounting part mounting the thermal detector element,
      a first arm part supporting the mounting part above the substrate and having one end linked to one end of the mounting part, and
      a second arm part supporting the mounting part above the substrate and having one end linked to the other end of the mounting part, a length of the second arm part being shorter than a length of the first arm part; and
   a plurality of wirings provided on the first arm part and electrically connected with the thermal detector element.

2. The thermal detector according to claim 1, wherein
   a thermal conductance G1 of the first arm part and a thermal conductance G2 of the second arm part satisfy a relationship G1≥G2.

3. An electronic instrument comprising the thermal detector according to claim 2.

4. A thermal detector device comprising:
   a plurality of the thermal detectors according to claim 2 arranged two-dimensionally.

5. The thermal detector according to claim 1, wherein
   the first arm part has
      a first insulating film provided on the substrate,
      a first wiring and a second wiring provided on the first insulating film, the first wiring and the second wiring being electrically isolated from each other and, and
      a second insulating film provided on the first wiring and the second wiring.

6. An electronic instrument comprising the thermal detector according to claim 5.

7. A thermal detector device comprising:
   a plurality of the thermal detectors according to claim 5 arranged two-dimensionally.

8. The thermal detector according to claim 1, wherein
   the first arm part has a first portion linked to the one end of the mounting part and extending in a first direction as seen in plan view, and a second portion connected to the first portion and extending in a second direction perpendicular to the first direction as seen in plan view, and
   the second arm part has only a third portion linked to the other end of the mounting part and extending in the first direction.

9. An electronic instrument comprising the thermal detector according to claim 8.

10. A thermal detector device comprising:
    a plurality of the thermal detectors according to claim 8 arranged two-dimensionally.

11. The thermal detector according to claim 1, wherein
    the support member and the substrate are arranged to form a cavity between the support member and the substrate, and
    the support member has a circuit-constituting element provided on the substrate in a region overlapping with the cavity as seen in plan view.

12. A thermal detector device comprising:
    a plurality of the thermal detectors according to claim 11 provided on a shared cavity,
    the first arm part of at least one of the thermal detectors being supported by a post that has a prescribed height from the substrate towards the thermal detector, the post including a conductive layer electrically connecting at least one of the wirings provided on the first arm part with a circuit-constituting element provided in a region of the substrate overlapping the shared cavity as seen in plan view.

13. The thermal detector device according to claim 12, wherein
    the thermal detectors includes a first thermal detector and a second thermal detector, and the second arm part of the first thermal detector and the first arm part of the second thermal detector are supported by the post.

14. A thermal detector device comprising:
    a plurality of the thermal detectors according to claim 11 arranged two-dimensionally.

15. An electronic instrument comprising the thermal detector according to claim 11.

16. The thermal detector according to claim 1, wherein
    the thermal detector element is an infrared-ray-detecting element.

17. A thermal detector device comprising:
    a plurality of the thermal detectors according to claim 16 arranged two-dimensionally.

18. An electronic instrument comprising the thermal detector according to claim 16.

19. A thermal detector device comprising:
    a plurality of the thermal detectors according to claim 1 arranged two-dimensionally.

20. An electronic instrument comprising the thermal detector according to claim 1.

* * * * *